United States Patent [19]

Hibbard

[11] Patent Number: 4,797,040

[45] Date of Patent: Jan. 10, 1989

[54] STRAP ON DRILL PARAPHERNALIA HOLDING SYSTEM (DPHS)

[75] Inventor: Bruce A. Hibbard, Los Angeles, Calif.

[73] Assignee: H-Tech, Inc., Sherman Oaks, Calif.

[21] Appl. No.: 9,946

[22] Filed: Feb. 2, 1987

[51] Int. Cl.⁴ .............................................. B23B 45/00
[52] U.S. Cl. ................................ 408/241 R; 206/379; 211/69; 211/70.6; 248/205.2
[58] Field of Search ..................... 408/241 R, 239 R; 206/379; 211/69, 70.6; 248/205.2

[56] References Cited

U.S. PATENT DOCUMENTS

| | | | |
|---|---|---|---|
| 2,322,797 | 6/1943 | Fishel | 211/69 |
| 2,594,955 | 4/1952 | Markowitz | 211/69 |
| 3,370,818 | 2/1968 | Perr | 248/205.2 |
| 3,387,341 | 6/1968 | Mates et al. | 248/205.2 |
| 3,576,304 | 4/1971 | Gillemot | 248/205.2 |
| 3,664,754 | 5/1972 | Kelbel | 408/241 R |
| 4,508,221 | 4/1985 | Olson | 206/379 |

FOREIGN PATENT DOCUMENTS

| | | | |
|---|---|---|---|
| 3514023 | 10/1986 | Fed. Rep. of Germany | 408/241 R |
| 977938 | 12/1964 | United Kingdom | 248/205.2 |

Primary Examiner—Gil Weidenfeld
Assistant Examiner—Daniel W. Howell

[57] ABSTRACT

A holding device that attaches directly to the motor or handle of an electric drill, allowing the user to store the drill paraphernalia needed for a particular job on the tool.

3 Claims, 2 Drawing Sheets

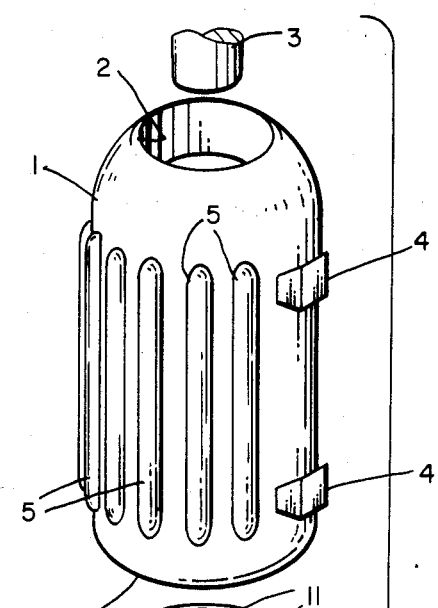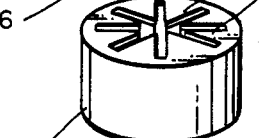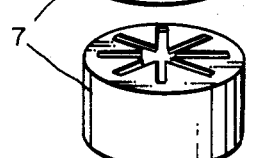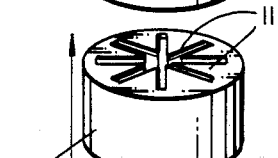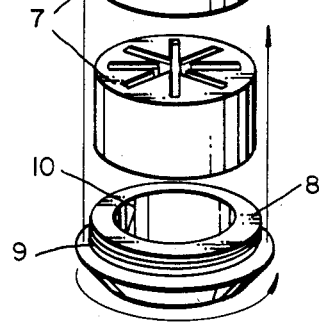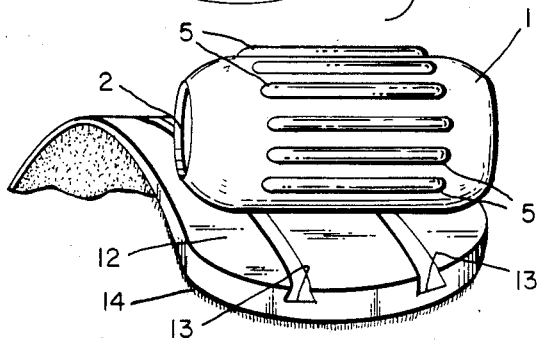
Fig. 1.
Fig. 3.

STRAP ON DRILL PARAPHERNALIA HOLDING SYSTEM (DPHS)

BACKGROUND - FIELD OF INVENTION

This invention relates to an attachment to motorized drills for holding accessories, such as drill bits, interchangeble magnetic screw bits and a variety of paraphernalia made for and to be used by motorized drills.

BACKGROUND - DESCRIPTION OF PRIOR ART

One of the most common problems shared by users of motorized drills is the temporary storage and retrieval of drill paraphernalia, which comprises bits, screw bits and an assortment of products made for drills.

When working with one or more drill bits or a combination of drill bits and screw bit accessories and the job calls for going back and forth, from bit to bit, articles are quite often lost or misplaced momentarily in a tool pouch, pocket or on the like, necessitating a time consuming search. I have experienced this dilemma quite often, having worked extensively in the construction trades.

A product is presently on the market which is basically a rotary drill bit holder that is attached to the electrical cord of a drill. It is operated in a manner by which the rotary head is adjusted to the desired bit, thereby allowing the bit to pass out of the housing for use. I have found this product to be a bit cumbersome and undesirable for the professional user. Generally this prior are device is undesirable, because in a practical application in the field a professional is most likely to be using only several bits, not an entire assortment, and perhaps one or more screw bits, which screw bits the above-mentioned device cannot hold.

Other types of on-drill storage systems are limited to a few battery-operated types with storage bays built into their housings. This system is naturally limited to screw bits only.

To this date there are no other on-drill storage systems, to my knowledge. Therefore I believe the DPHS will provide drill users a new and innovative way to effectively store and retrieve drill accessories neatly and securely right on the drill.

OBJECTS AND ADVANTAGES

Accordingly, I claim the following as objects and advantages of the invention; to provide an economical, functional, on-drill storage system for drill bits and accessories. Further, to eliminate the misplacement and loss of paraphernalia due to frequent changing and to cut down the change-over time from bit to bit drastically because of the close proximity between chuck and drill motor or handle.

In addition, I claim the following as objects and advantages. Often in the field, a user will be utilizing several types of accessories for a single job. A common situation would be applying hinges to an oak door. The installer would first drill pilot holes with an appropriate drill bit. Then, using a PHILLIPS head screw tip, he would fasten the hinge to the door with the PHILLIPS head screws. Another situation is dismantling objects that require more than one screw. These are just a few illustrations of a sea of related situations. With most professional users and home-owners alike, the instant invention provides a holding system which singularly conforms to a variety of diameters. Henceforth, a single Drill Bit Holding Cylinder (DBHC), will accommodate many different accessories and snugly hold the articles in place against the drill until needed and retrieved.

DRAWING FIGURES

FIG. 1 shows an exploded view of the Drill Bit Holding Cylinder (DBHC).

FIG. 3 shows the DBHC mounted, by means of dovetail and groove, to the cylinder base.

DRAWING REFERENCE NUMERALS

Figure 2:
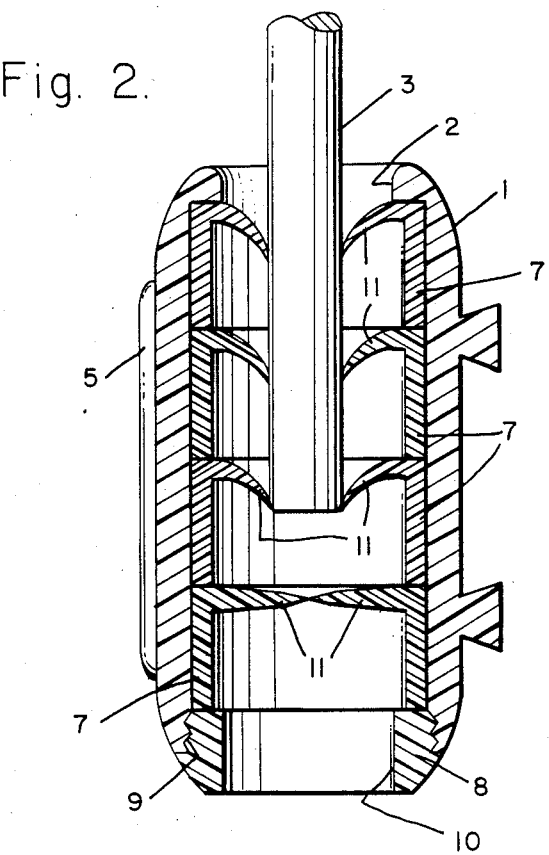
FIG. 2 shows a cross sectional view of the DBHC with its respective members, assembled and in a working manner.

1: Cylinder casing
2: Upper opening and insertion point 1
3: Typical article to be inserted into 2
4: Dovetail extrusion on 1
5: Radius griping ribs on 1
6: Lower opening with end cap removed
7: Diaphragm
8: Removeable end cap
9: Threads of 7
10: Opening of 8
11: Tapered and beveled ribs of 7
12: Cylinder base
13: Dovetail grooves upon 12
14: VELCRO backing on 12
15: Elastic end of 16
16: Webbed strap
17: Typical drill

THREE PIECE APPARATUS - DESCRIPTION (Drill Bit Holding Cylinder (DBHC), Strap and Base)

FIG. 1 shows the DBHC 1 with all of its respective members in an exploded view. This is the active ingredient of the invention which by no means makes any other part of lessor importance. The DBHC 1, for instance, approximately 2.54 cm long, by 1.27 cm long, by 1.27 cm wide and hollow, with a removeable cap 8. The exterior of the DBHC 1 has raised radius gripping ribs 5 to enhance the design factor as well as provide the user with a substantial hold while mounting and removing the DBHC 1. Shown also in FIG. 1 are the two dovetail extrusions 4, for sliding the DBHC into position along the cylinder base 12(FIG. 3).

FIG. 2 shows a typical article 3 being inserted into the DBHC 1. The DBHC casing 1 and the end cap are both suitably made of an impact resistant plastic composition, which the diaphragms 7 are made of a flexible polyethylene material with tapered and beveled ribs 11. FIG. 3 shows the DBHC 1 incorporated into the cylinder base 12 by means of dovetail and grooves 4 and 13. The cylinder base 12 is also made of a flexible material and VELCRO backed for attachment to the Drill Paraphernalia Holding System (DPHS) strap 14,15,16.

Figure 4:
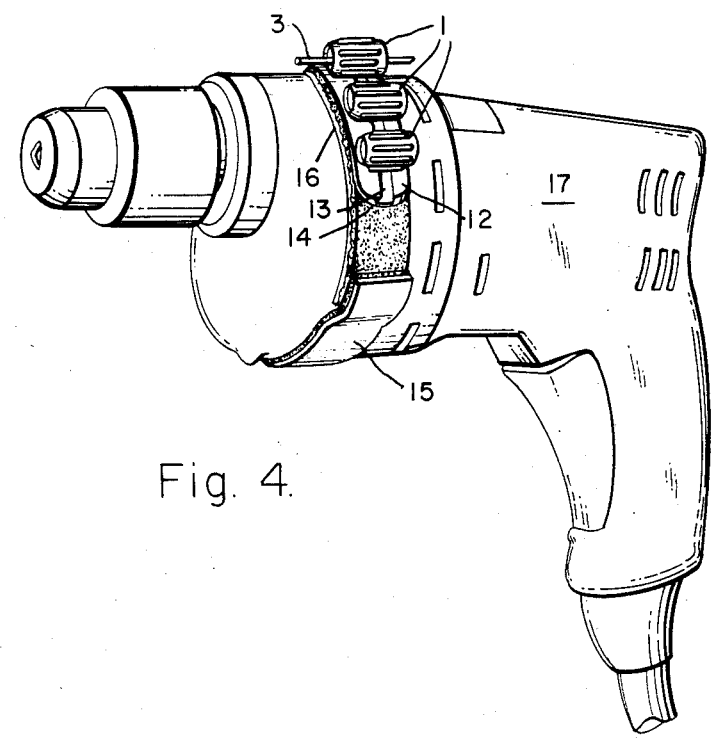
FIG. 4 shows the complete apparatus attached to a typical drill.

FIG. 4 shows the cylinder base 12 attached (by VELCRO) to the DPHS strap 14,15,16, which is a durable webbing 16 suitably about 2.54 cm wide by 25.4 cm long. 5.08 cm of an elastic material 15 is sewn to one end for tensioning the strap around the drill motor or handle. VELCRO backing 14 is sewn the full length of the top side for strap utilization on a variety of drill body sizes. The cylinder base 12, which attached DBHC is then placed at any desired location along the exposed VELCRO backed strap.

THREE PIECE APPARATUS - OPERATION

This three piece apparatus shown in FIG. 4, can be utilized to hold a variety of drill paraphernalia on the drill. While performing a multitude of tasks where one or more articles are used, this unique DPHS increases productivity by decreasing change-over time and practically eliminating loss of accessories.

To use the Drill Paraphernalia Holding System (DPHS), one simply attaches the strap 14,15,16 to the motor or handle (either battery or externally powered) of a typical drill, as shown in FIG. 4. This is accomplished by tensioning the elastic portion 15 of the strap around the desired location and securing it on the VELCRO backed top 14. One caution should be noted. Care should be taken to apply the DPHS without blocking breathing ports on the tool. This could lead to excessive heat build-up and eventual damage of the drill. However, tests have been made on dozens of drills found in the marketplace, industrial as well as home use drills, and all seem to have an area around the motor where the DPHS can be applied without obstructing said breathing ports.

Once the DPHS strap 14,15,16 is in place, the cylinder base 12 can be mounted at any desired location along the exposed VELCRO backing 14. As many as three Drill Bit Holding Cylinders (DBHC) 1 can then be inserted along the dovetail grooves 13 on the cylinder base 12. Care should be taken to mount the DBHC in a manner where they will be best utilized.

Now that the DPHS is mounted and in place on the tool, it is ready for use. One simply inserts drill bits or screw tips into the opening 2 of the DBHC for storage. The bit or tip passes through a series of diaphrams 7(FIG. 2) which have two multiple ribbed surfaces 11. The ribbed surface allows the diaphragm to perform as a variable opening with an inherent spring-back tendency, which holds the article in place. A tapered surface with beveled edges 11 is also incorporated into the diaphrams' design. The taper gives the diaphragm graduated resistance which automatically adjusts proportionately to the size of article inserted. The beveled edge of the ribs flex quite easily, reducing damage to the diaphragm from wear and tear caused by sharp articles. After considerable use, it will be necessary to replace the diaphragms due to wear by sharp drill bits and such. This is easily accomplished by unscrewing the bottom of the DBHC and replacing the diaphragms. Since the bulk of wear and tear result from insertion of sharp articles, it would be advisable to insert the proposed article blunt end first. This will prolong the life of the inner diaphragms.

The drill accessories are now stored on the drill until again needed, held fast by the diaphragms 7 inside the cylinder 3(FIG. 4). Surprisingly, the bits take up very little space, and in practical application of the apparatus, I have found it quite revolutionary. Not only does it save an enormous amount of time, it saves money due to practically eliminating loss of paraphernalia.

CONCLUSIONS

The permutations within the scope of the invention are many. For instance, larger systems can be developed to accomodate larger industrial drills. Smaller DPHS straps for adapting to the handles of battery-operated units can be provided. Different attachments can be designed to hold abnormally shaped articles and screw bits too small to be used in conjunction with the standard DBHC 1. Also, various applications will be utilized. A VELCRO strap with an adhesive backing can be sold as a means of alternate storage. By applying the VELCRO to a desirable location on a tool belt, the DBHC 1 and base 12, can be mounted therewith, or mounted anywhere the system can be utilized. The DPHS could even be mounted to the wrist of the user, as an alternate means of use.

This application does not specifically describe all obvious permutations, but mentions a few. This is a new concept for drill paraphernalia management, which has unlimited potential for use in this field. Anywhere there is a drill, the system can be used. Accordingly, the reader is requested to determine the scope of the invention by the appointed claims and their legal equivalents and not by the examples which have been given.

I claim:

1. A holding device for storing drill bits or drill accessories upon a drill body, comprising:
    (a) an adjustable circular strap consisting of an elastic portion and a fastening device to fasten one end of said strap to another portion of said strap, said elastic portion being stretched when said strap is placed on the drill body to securely locate the strap on the drill;
    (b) a pad which will fasten to the strap;
    (c) a means to fasten the pad to the strap;
    (d) a plurality of sleeves having means to connect the sleeves to the front of the pad, each sleeve having a plurality of axially spaced, flexible ribs extending radially inward from the inner circumference of the sleeve such that a drill bit may be removably inserted into the sleeve and be held by the ribs until the bit is removed for use.

2. A holding device as in claim 1, wherein the means to connect the sleeve to the front of the pad consists of a dovetail extension on the sleeve which slides within a dovetail groove on the front of the pad.

3. A holding device as in claim 1, wherein the fastening device is VELCRO.

* * * * *